July 9, 1946.   M. E. WILKE   2,403,571
DRY CELL
Filed Dec. 31, 1943
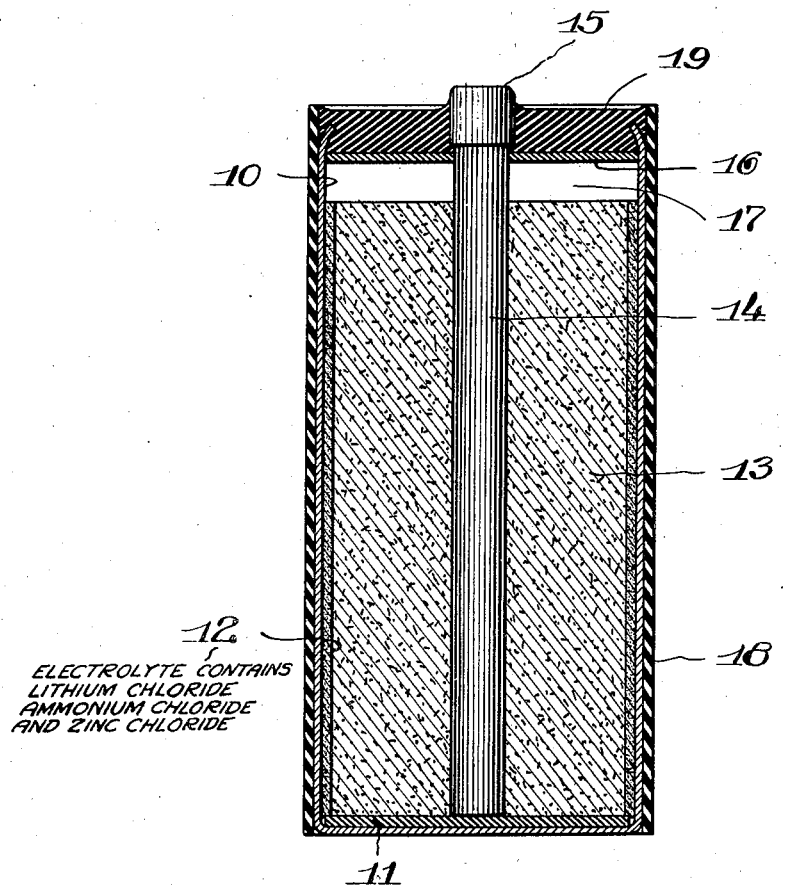
INVENTOR.
Milton E. Wilke
BY
Tesch and Darbo Attys Patented July 9, 1946

2,403,571

UNITED STATES PATENT OFFICE 2,403,571

DRY CELL

Milton E. Wilke, Freeport, Ill., assignor to Burgess Battery Company, Freeport, Ill., a corporation of Delaware Application December 31, 1943, Serial No. 516,452

16 Claims. (Cl. 136—155)

This invention relates to improvements in dry cells, and particularly to the provision of a dry cell which has improved low temperature operating characteristics.

It is the primary object of the invention to provide a dry cell which has improved performance characteristics at low temperatures, by which is meant temperatures between 0° F. and the neighborhood of −60° F.

The dry cells which have been known heretofore in general exhibit inferior performance characteristics at temperatures below 0° F. In fact, at a temperature of −10° F., operation has been entirely unsatisfactory. At such low temperatures, the liquid electrolytes of some dry cells become congealed or at least stiffened to a considerable degree, and this condition may be a factor in causing poor performance. However, the prevention of the condition does not insure good performance at low temperature. The liquidity may be preserved by adding anti-freeze agents, such as alcohol, to the electrolyte, but the low temperature performance of the resulting dry cells is very inferior. Certain electrolytes, such as zinc chloride, when added to the electrolyte solution in sufficient amount, have the property of reducing or preventing the congealing effect of low temperature. The resulting solutions, however, have such high viscosity and electrical resistance as to be unsuitable for use.

There are many applications in which good low-temperature performance of dry cells is important, as in the operation of radios, flashlights, etc., in cold climates and in airplanes flying at high altitudes. The present invention provides a dry cell which has improved performance characteristics over the low temperature range and operates satisfactorily at temperatures down to −60° F.

Briefly, these improved characteristics are obtained by incorporating lithium chloride in the dissolved condition in the aqueous electrolyte of the cell. Such electrolyte may be composed of the usual salts, such as ammonium chloride and zinc chloride. It has been found that such an aqueous electrolyte solution containing at least a certain minimum amount of lithium chloride dissolved therein remains liquid at −60° F., and that a dry cell employing such a solution for the electrolyte operates satisfactorily at that temperature, and exhibits improved performance characteristics throughout the low temperature range.

The single figure of the drawing is a longitudinal sectional view of a dry cell made in accordance with the invention.

It is to be understood that the invention is not limited to the particular structure which is described. The latter is illustrative only and any desired structural form may be used.

The dry cell illustrated is of the Leclanche type and consists of an open-top, cylindrical can-shaped zinc anode 10, the upper edge portion of which is turned inwardly at an angle, as shown. Upon the bottom of the can is disposed a layer 11 of electrical insulating and electrolyte resisting material, such as blotting paper, paperboard, resin composition, heat-fusible pitch or wax composition, or the like. Against the interior cylindrical surface of the can is disposed a layer 12 of bibulous electrical insulating material, such as paper or gelatinized starch, which carries the liquid electrolyte. Compressed within the can and in contact with the layer 12 is a body 13 of moist depolarizing material, which may be composed, in accordance with known practice, of a mixture of natural manganese dioxide ore or artificial manganese dioxide and finely divided conductive material, such as carbon or graphite, moistened with the liquid electrolyte. Centrally disposed within the depolarizing body 13 is a rod-shaped carbon cathode 14, carrying a metal cap 15 upon its upper end. The moist depolarizing body 13 is compacted in position, thereby making firm contact with the cathode 14 and the layer 12, and the layer 12 serves to separate the depolarizing body from the anode 10. Spaced above the top of the depolarizing body 13 is a washer 16 of electrical insulating and electrolyte resisting material, such as paper or cardboard, the space 17 between the top of the depolarizing body and the washer serving as an expansion space for the reception of liquids and gases which may be formed as a result of the operation of the cell. A cylindrical jacket 18 of electrical insulating and electrolyte resisting material such as paperboard surrounds the cylindrical wall of the can and extends upwardly a slight distance above the top of the can. A seal closure 19 for the open top of the can, composed of pitch or wax, rests upon washer 16 and embeds the turned-in edge portion of the can 10 and makes sealing contact with the metal cap 15. Closure 19 makes an adherent joint with the upper edge portion of the enclosing jacket 18 and holds the latter in place.

In accordance with the present invention, the aqueous electrolyte contained in the layer 12 and the depolarizing body 13 contains lithium chloride dissolved therein. When the term "electrolyte" is referred to herein it is intended to mean the electrolyte contained in both the layer 12 and the depolarizing body 13.

The electrolyte may contain one or more other electrolyte salts, such as ammonium chloride and zinc chloride. The total amount of the salts present should be sufficient to maintain the electrolyte in the liquid condition and result in satisfactory performance at the lowest temperature at which it is desired that the cell shall operate.

The proportions of the electrolyte ingredients may be varied. The presence of the smallest amount of lithium chloride results in improved low temperature performance, and if temperatures only slightly below 0° F. are expected, a very small amount of lithium chloride may be sufficient. The following proportions, by weight, are satisfactory for operation over the low temperature range down to —60° F.:

| | Parts |
|---|---|
| Water | 100 |
| Lithium chloride | 10 to 45 |
| Ammonium chloride | 8 to 37 |
| Zinc chloride | 20 to 80 |

The following are examples of specific electrolyte compositions which have been employed, the proportions being by weight:

| | I | II |
|---|---|---|
| | Parts | Parts |
| Water | 100.0 | 100 |
| Lithium chloride | 17.0 | 23 |
| Zinc chloride | 64.0 | 18.5 |
| Ammonium chloride | 7.5 | 12.3 |

At temperatures below 0° F., some of the solutions within the limits of concentrations set forth heretofore may be supersaturated with respect to one or more of the salts, and solid crystals may be present, but the electrolyte is in the liquid condition and the cell is electrolytically active.

Although it is preferred to have ammonium chloride and zinc chloride present, the electrolyte solution may contain lithium chloride only. In such case the solution may contain from approximately 30 parts to approximately 45 parts by weight of lithium chloride for each 100 parts of water. A dry cell containing such electrolyte exhibits satisfactory low temperature performance.

The following gives an indication of the low temperature performance characteristics of the dry cell of this invention. Cylindrical dry cells of the ordinary flashlight dry cell size, e. g., having a diameter of 1¼ inches and a height of 2¼ inches, and containing the electrolyte composition given in Example II heretofore, were subjected to performance tests. Each cell was connected to a resistance of 4 ohms. The circuit was maintained closed for 4 minutes and then maintained open for 56 minutes. This procedure was repeated for 8 hours out of each 24 hours until the cell was considered to be exhausted. This test was designed to subject the cell to a drain approximating that experienced in flashlight service. The test was carried out at —40° F. and also at room temperature, and upon cells which were freshly made and also upon cells which had stood on shelf for 6 months after having been made.

The initial open circuit voltage in every case was 1.5 volts and the tests were discontinued when the closed circuit voltage had dropped to 0.90 volt. At —40° F. the freshly made cells were operative for approximately 100 minutes in the actual delivery of energy. Substantially the same service was delivered by the cells which had stood on the shelf for 6 months. An ordinary dry cell delivers substantially no energy at —40° F., and very little at —10° F.

At room temperature (70° F.), both the freshly made cells and those which had stood on shelf delivered somewhat more than 800 minutes of service. This compares favorably with the operation of cells known heretofore and shows that the cells of this invention are adapted for operation at ordinary temperatures as well at low temperatures.

In the tests which are described heretofore, —40° F. was chosen arbitrarily for the low temperature. It may be that such low temperature will not be encountered in the application for which the cell is designed, in which case considerably less lithium chloride may be required than is contained in the electrolyte compositions set forth heretofore. Any desired amount may be used, depending upon the temperature conditions under which the cell is intended to operate.

I claim:

1. An aqueous dry cell electrolyte containing lithium chloride.

2. An aqueous dry cell electrolyte containing lithium chloride in an amount equal to from approximately 10 parts to approximately 45 parts by weight for each 100 parts of water contained in said electrolyte.

3. A dry cell of the Leclanche type having an aqueous electrolyte, said electrolyte containing lithium chloride.

4. A dry cell of the Leclanche type having an aqueous electrolyte, said electrolyte containing lithium chloride in an amount from substantially 10 parts to substantially 45 parts by weight for each 100 parts of water contained in said electrolyte.

5. A dry cell having an aqueous electrolyte, said electrolyte containing lithium chloride and zinc chloride.

6. A dry cell having an aqueous electrolyte, said electrolyte containing lithium chloride and ammonium chloride.

7. A dry cell having an aqueous electrolyte, said electrolyte containing lithium chloride, ammonium chloride and zinc chloride.

8. A dry cell having an aqueous electrolyte, said electrolyte containing lithium chloride, ammonium chloride and zinc chloride, said lithium chloride being present in an amount from approximately 10 parts to approximately 45 parts by weight for each 100 parts of water contained in said electrolyte.

9. A dry cell comprising an anode, a cathode and an aqueous electrolyte between said anode and cathode, said electrolyte containing ammonium chloride and lithium chloride.

10. A dry cell comprising a zinc anode, a carbon cathode and an aqueous electrolyte between said anode and cathode, said electrolyte containing ammonium chloride and lithium chloride.

11. A dry cell comprising an anode and a cathode, a body of depolarizing material adjacent said cathode and spaced from said anode, and an aqueous electrolyte moistening said depolarizing body and in the space between said depolarizing body and said anode, said electrolyte containing lithium chloride.

12. A dry cell comprising an anode and a cathode, a body of depolarizing material adjacent said cathode and spaced from said anode, and an aqueous electrolyte moistening said depolarizing body and in the space between said depolarizing body and said anode, said electrolyte containing lithium chloride in an amount from approximately 10 parts to approximately 45 parts by weight for each 100 parts of water contained in said electrolyte.

13. A dry cell comprising an anode and a cathode, a body of depolarizing material adjacent said cathode and spaced from said anode, and an aqueous electrolyte moistening said depolarizing body and in the space between said depolarizing body and said anode, said electrolyte containing lithium chloride and ammonium chloride.

14. A dry cell comprising an anode and a cathode, a body of depolarizing material adjacent said cathode and spaced from said anode, and an aqueous electrolyte moistening said depolarizing body and in the space between said depolarizing body and said anode, said electrolyte containing lithium chloride and zinc chloride.

15. A dry cell comprising an anode and a cathode, a body of depolarizing material adjacent said cathode and spaced from said anode, and an aqueous electrolyte moistening said depolarizing body and in the space between said depolarizing body and said anode, said electrolyte containing lithium chloride, zinc chloride and ammonium chloride.

16. A dry cell comprising an anode and a cathode, a body of depolarizing material adjacent said cathode, and an aqueous electrolyte between said depolarizing body and said anode, said electrolyte containing lithium chloride, ammonium chloride and zinc chloride, said lithium chloride being present in an amount from approximately 10 parts to approximately 45 parts by weight for each 100 parts of water contained in said electrolyte.

MILTON E. WILKE.